United States Patent
Leja et al.

(10) Patent No.: US 6,618,771 B1
(45) Date of Patent: Sep. 9, 2003

(54) METHOD AND APPARATUS FOR USE IN INSTALLING A SCANNER

(75) Inventors: Tina Marie Leja, Fort Collins, CO (US); Michelle A Watson, Loveland, CO (US); John D Mathis, Colorado Springs, CO (US); Laurie Anderson, Woodland Park, CO (US); Erin E Geegan, Colorado Springs, CO (US); Robert M Fontaine, Canon City, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 09/504,822

(22) Filed: Feb. 16, 2000

(51) Int. Cl.⁷ .............................................. G06F 13/00
(52) U.S. Cl. .............................. 710/8; 710/10; 710/12; 710/18; 710/19; 710/20; 710/200
(58) Field of Search ............................... 710/8, 10, 12, 710/18, 19, 20; 709/200

(56) References Cited

U.S. PATENT DOCUMENTS

| | | | |
|---|---|---|---|
| 5,432,914 A | * 7/1995 | Cho | 358/401 |
| 5,483,467 A | * 1/1996 | Krupka et al. | 709/200 |
| 6,122,684 A | * 9/2000 | Sakura | 710/73 |
| 6,141,704 A | * 10/2000 | Huang | 710/15 |

* cited by examiner

Primary Examiner—Jeffrey Gaffin
Assistant Examiner—Mohammad O. Farooq

(57) ABSTRACT

A method and apparatus are provided for interactively guiding a user through a scanner installation procedure. When a scanner installation program is launched, the scanner installation program causes various screens having various options to be displayed to a user. The screens provide the user with information that guides the user step-by-step through the scanner installation procedure. The scanner installation program automatically detects which I/O ports of the user's computer are available for connection to the scanner and displays a message to the user indicating which I/O port(s) is available for connection to the scanner. The scanner installation program then provides the user with the option of seeing a visual demonstration of steps that need to be taken by the user in connecting the scanner to the available I/O port of the computer. The user is also provided with the option of printing out, written instructions that list the steps that need to be taken in connecting the scanner to the available I/O port. The scanner installation program also provides the user with options as to which scanning software packages are to be installed on the user's computer. When the user selects scanning software packages to be installed on the computer, the amount of memory and time required for installation of each scanning software package is displayed to the user.

25 Claims, 11 Drawing Sheets

| | | | |
|---|---|---|---|
| | Parallel.print | field | Parallel Installation Procedure<br><br>1. Shut down your computer and turn off your computer and printer.<br>2. Unlock the scanner. Slide the lock toward the unlocked position until it clicks into place. (The scanner has a carriage lock that protects the internal components from damage during shipment.)<br>3. Disconnect the end of the printer cable that currently connects to the back of your computer.<br>4. Connect the free end of the printer cable to the back of the scanner. Use the port labeled for connecting the printer. The printer is now connected to the scanner.<br>5. Connect the scanner cable to the parallel printer port on the computer.<br>6. Connect the other end of the scanner cable to the back of the scanner. Use the port labeled for connecting the computer.<br>7. (Optional) If you have purchased a scanner accessory (such as an Automatic Document Feeder or Transparency Adapter), attach it to the scanner:<br>   a. Remove the scanner lid.<br>   b. Lift the accessory and align the mounting posts with their guide holes.<br>   c. Lower the accessory |

FIG. 9

| | usb.print | field | USB Installation Procedure |
|---|---|---|---|
| | | | 1. Unlock the scanner. Slide the lock toward the unlocked position until it clicks into place. (The scanner has a carriage lock that protects the internal components from damage during shipment.)<br>2. Connect the square end of the USB cable to the USB port on the scanner.<br>3. Connect the rectangular end of the USB cable to any of the identical USB ports on the back of your computer.<br>4. (Optional) If you have purchased a scanner accessory (such as an Automatic Document Feeder or Transparency Adapter), attach it to the scanner:<br>a. Remove the scanner lid.<br>b. Lift the accessory and align the mounting posts with their guide holes.<br>c. Lower the accessory onto the scanner.<br>d. Plug the accessory cable into the port on the back of the scanner. Use the port labeled ADF for connecting an Automatic Document Feeder. Use the port labeled XPA for connecting a Transparency Adapter<br>5. Connect the power cord to the back of the scanner. |

FIG. 10

| | | | |
|---|---|---|---|
| | scsi.print | field | SCSI Installation Procedure<br><br>Note: This procedure assumes that you already have a SCSI port or card installed on your computer.<br><br>1. Shut down and turn off your computer.<br>2. Unlock the scanner. Slide the lock toward the unlocked position until it clicks into place. (The scanner has a carriage lock that protects the internal components from damage during shipment.)<br>3. Connect the scanner cable to the SCSI port on the scanner.<br>4. Connect the other end of the scanner cable to the SCSI port on the computer.<br>5. (Optional) If you have purchased a scanner accessory (such as an Automatic Document Feeder or Transparency Adapter), attach it to the scanner:<br>  a. Remove the scanner lid.<br>  b. Lift the accessory and align the mounting posts with their guide holes.<br>  c. Lower the accessory onto the scanner.<br>  d. Plug the accessory cable into the port on the back of the scanner. Use the port labeled ADF for connecting an Automatic Document Feeder. Use the port labeled XPA for |

FIG. 11

METHOD AND APPARATUS FOR USE IN INSTALLING A SCANNER

TECHNICAL FIELD OF THE INVENTION

The present invention relates to scanners and, more particularly, to a scanner installation program that, when executed by a computer, interactively guides a user through the steps involved in installing a scanner,

BACKGROUND OF THE INVENTION

Scanners are quickly becoming common peripheral devices. They are now commonly employed in homes where they are used with personal computers (PCs) as well as in work environments where they are integrated into local area networks (LANs). Scanners optically scan objects such as documents containing text and/or images and convert the optical information into electrical information that is then digitized. The digital information may then be reproduced or manipulated for various purposes.

Currently, the only guidance that is provided to users to facilitate the scanner installation procedure is in the form of pamphlets or posters that contain textual instructions that instruct the user as to how to install the scanner. For the user to successfully use these instructions, the user typically must have good knowledge about the computer to which the scanner is to be connected and about the scanner itself, For example, PCs typically include a variety of interfaces and resources for supporting peripheral devices. The user must be aware of which interfaces are available and suitable for connection to the scanner. In addition, the user must be able to determine when a step in the installation process has been completed successfully. The user must typically rely on prior expertise or some type of verification test upon completion of the entire procedure.

Similarly, the user must know which interface of the scanner is suitable for connection to the PC. Many scanners today come with dual interfaces to enable them to be usable by a broad base of users. For example, the user may have parallel and universal serial bus (USB) interfaces, or USB and Small Computer System Interface (SCSI) interfaces. The user must have knowledge of these interfaces and determine which interface is most suitable for connection to the interface of the computer.

One of the disadvantages of using a non-interactive scanner installation guide, such as the aforementioned textual instructions, is that many users do not know what resources or interfaces are available on their computer, or which interface is the most appropriate to use for connection to the scanner. Similarly, when provided with multiple interface options on the scanner, many users do not know which interface is the most appropriate for connection to the computer. Also, the scanner installation process typically involves installation of various scanner programs. Therefore, the user typically must also have knowledge of which programs are already installed, which programs must be installed, which programs may be installed, and the amount of memory available and required for installation of these programs. Many users do not possess this type of knowledge.

Accordingly, a need exists for a tool that interactively guides the user through the scanner installation process.

SUMMARY OF THE INVENTION

The present invention provides a method and apparatus for interactively guiding a user through a scanner installation procedure. When a scanner installation program is launched on a computer, the scanner installation program causes various screens having various options to be displayed to a user on a display device in communication with the computer. The screens provide the user with information that guides the user step-by-step through the scanner installation procedure. The scanner installation program automatically detects which I/O port(s) of the user's computer are available for connection to the scanner and displays a message to the user indicating which I/O port(s) are available for connection to the scanner. The scanner installation program then provides the user with the option of seeing a visual demonstration of steps that need to be taken by the user in connecting the scanner to the available I/O port of the computer. The user is also provided with the option of printing out written instructions that list the steps that need to be taken in connecting the scanner to the available I/O port.

The scanner installation program also provides the user with options as to which scanning software packages are to be installed on the user's computer. When the user selects scanning software packages to be installed on the computer, the amount of memory and time required for installation of each scanning software package is displayed to the user. The amount of memory that is available on the user's computer for installation of the scanning software packages is also displayed to the user. Once the required software has been installed and the scanner is properly connected to the user's computer, a message is displayed to the user that informs the user that the scanner appears to be properly connected and provides the user with instructions for obtaining additional information that will help the user use the scanner.

Other features and advantages of the present invention will become apparent from the following description, drawings and claims.

BRIEF DESCRIPTION OF THE DRAWINGS

FIGS. 9–11 illustrate textual instructions that are printed out to assist the user in connecting various computer interfaces to the scanner.

DETAILED DESCRIPTION OF THE INVENTION

In accordance with the present invention, a scanner installation program is provided that interactively guides the user through the scanner installation procedure. The scanner installation program is stored on a computer-readable medium, such as, for example, a compact disk read only memory (CD ROM) device. Preferably, the storage medium also contains various initialization files and scanning programs that are accessible by the scanner installation program. The scanner installation program of the present invention displays various windows containing menus and instructions that guide the user through the installation process step-by-step. The scanner installation program of the present invention checks the user's computer to determine which interfaces are available and which are the most suitable for connection to the scanner and displays this information to the user. The scanner installation program of the present invention then provides step-by-step visual aids that show the user how to connect the scanner to the user's computer.

The scanner installation program also guides the user step-by-step through the process of installing scanning software by providing information to the user as to the amount of memory required for installation of a particular scanning program, the amount of memory available on the user's computer for installation of the program, the amount of time that will be required for installation of each program, and a notification indicating that the programs have been installed. Other features and aspects of the present invention will become apparent from the following discussion of the various windows, menus and instructions.

Figure 1:
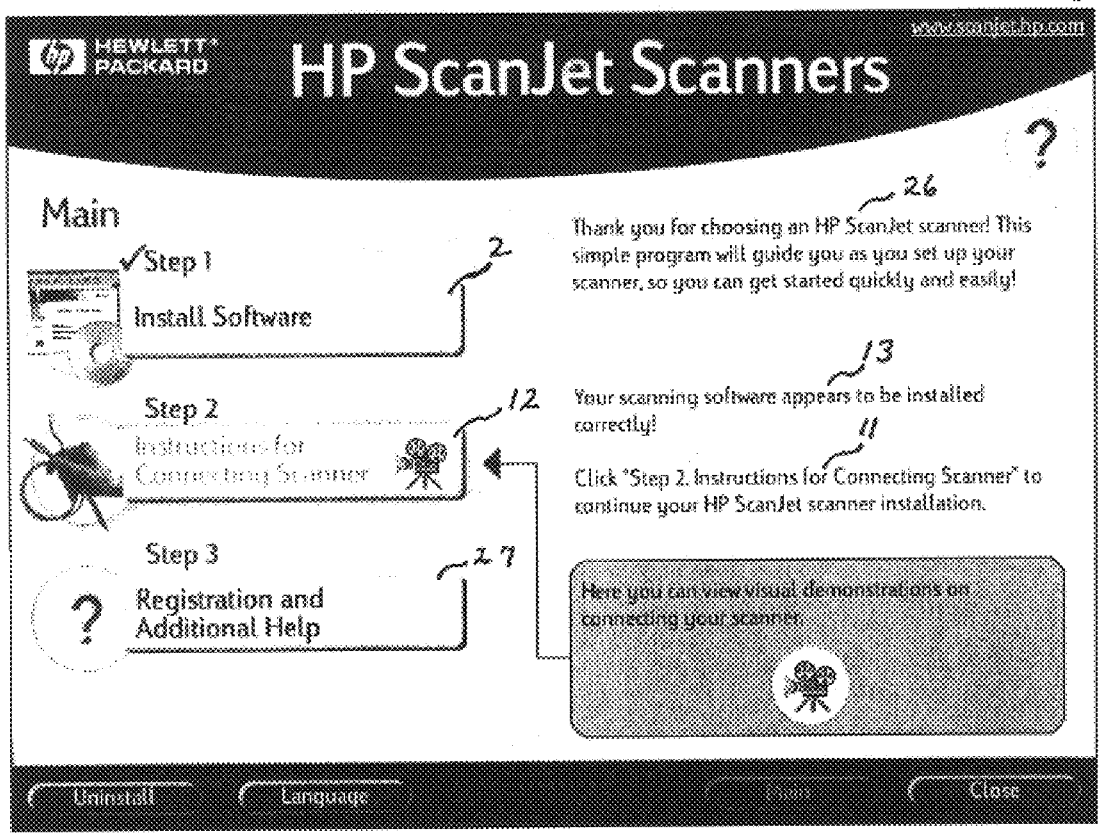
FIG. 1 is a drawing of a main menu screen that is displayed to the user by the scanner installation program of the present invention when the scanner installation program is launched.

When the scanner installation program of the present invention is launched, the main menu 1 shown in FIG. 1 is displayed to the user. If multiple languages are listed in the initialization file associated with the scanner installation program, the "Language" button shown in FIG. 1 will appear on the bottom button bar of the screen. The user has the option of clicking the "Language" button to display the Change Language screen shown in FIG. 2. The user may then change the language in which the text in the screens is displayed by selecting a language from the list presented. When the user chooses an alternate language on the Change Language screen, the scanner installation program searches for a language-specific initialization file and reads in translated text values for certain factory-customizable words on the screen, such as the software package titles and descriptions. In addition, the scanner installation program loads media elements, such as screen titles, button labels and procedure steps from a language-specific media object file. This allows the program to dynamically change the displayed language while it is running rather than having to build language-specific versions of the executable program itself.

Figure 2:
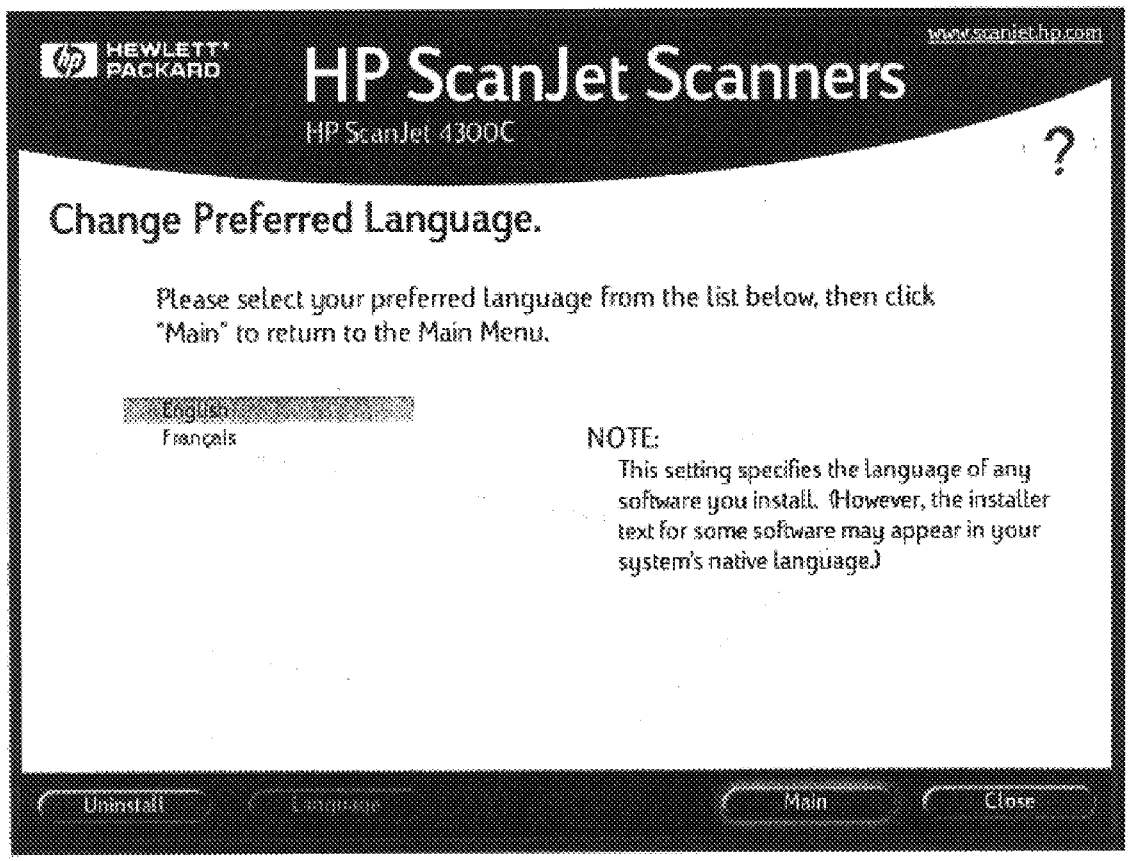
FIG. 2 is a drawing of a screen that is displayed to the user by the scanner installation program of the present invention when the "Language" button displayed on the bottom button bar of the screen shown in FIG. 1 is clicked. This "Language" button is only displayed if multiple languages are available from which to choose.
Figure 3:
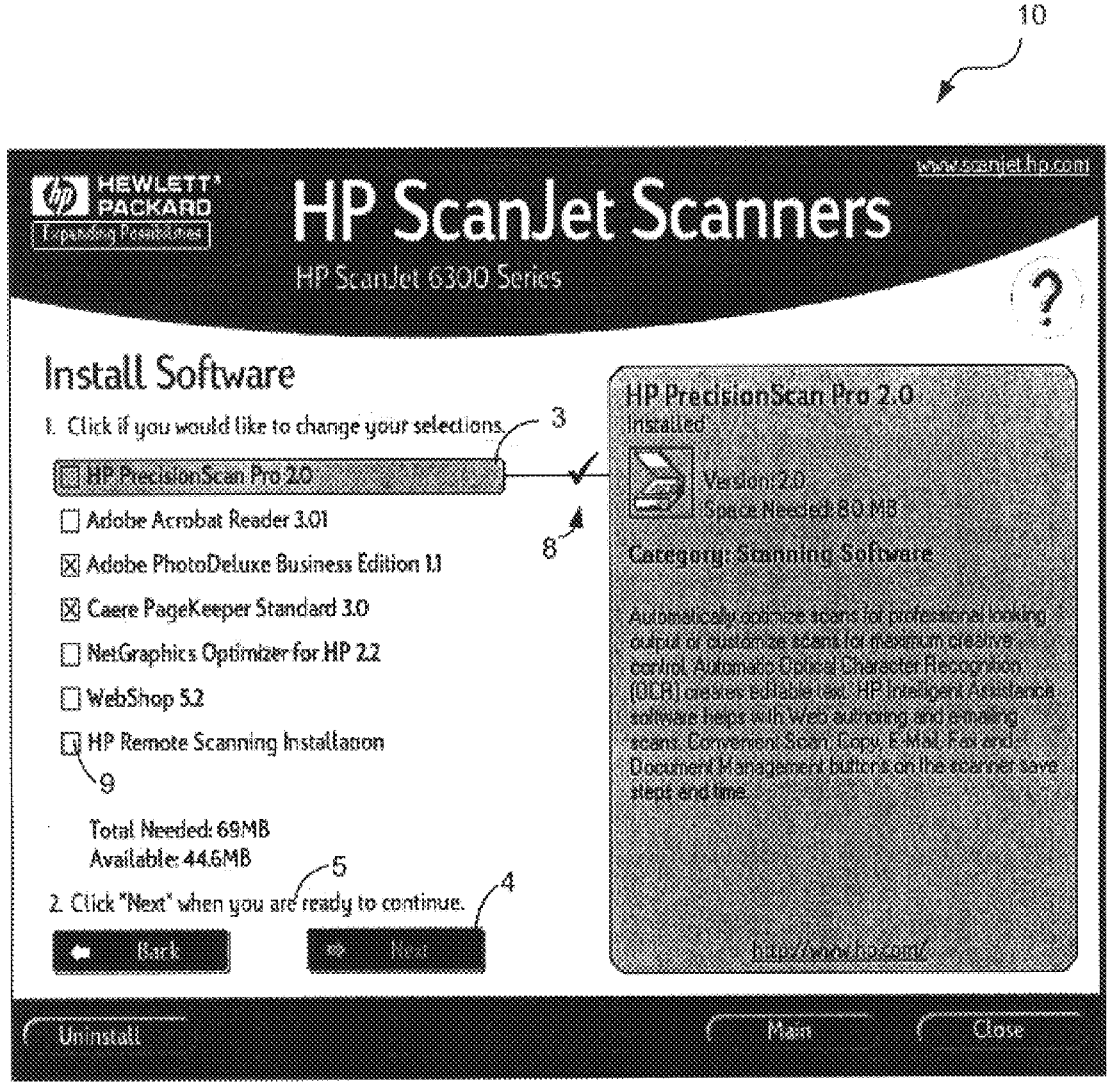
FIG. 3 is a drawing of a software installation screen that is displayed to the user by the scanner installation program of the present invention to enable a user to select the scanning software packages that are to be installed on the user's computer.

Once the user returns to the main menu 1 by clicking on the "Main" button shown in FIG. 2, or if the user remains on the main menu 1 shown in FIG. 1 from the start, the user is directed to begin the installation process by clicking the button labeled "Step 1. Install Software". Upon clicking the "Install Software" button, the screen 10 shown in FIG. 3 is displayed. The primary Install Software screen 10 displays a wealth of information to help the user decide which software packages to install. Before coming to this screen, the user is able to select "Typical" (HP-recommended), "Minimal" or "Custom" software installations from another screen (not shown), which will cause the boxes beside the appropriate software packages in the Install Software screen 10 shown in FIG. 3 to be pre-checked. If the user is on Windows NT and does not have administrator rights, a dialog (not shown) will prevent the user from proceeding further and instruct the user to get the appropriate privileges for installing software.

The primary Install Software screen 10 displays a list of the software packages that are available for installation. For each software package, the following information is displayed as the user rolls the mouse or arrows down over the package title: version, estimated (disk) space required, category (of use), description of what the user can do with the software, the identifying icon/logo graphic, the live URL link to software maker's Web site, and the status of the software (required, installed). For example, FIG. 3 illustrates this information being displayed for a software package 3 called "HP Precision Pro 2.0". As the user selects the software packages to be installed, a running total of the disk space that is required for installation and the disk space that is available on the user's PC are displayed.

Figure 4:
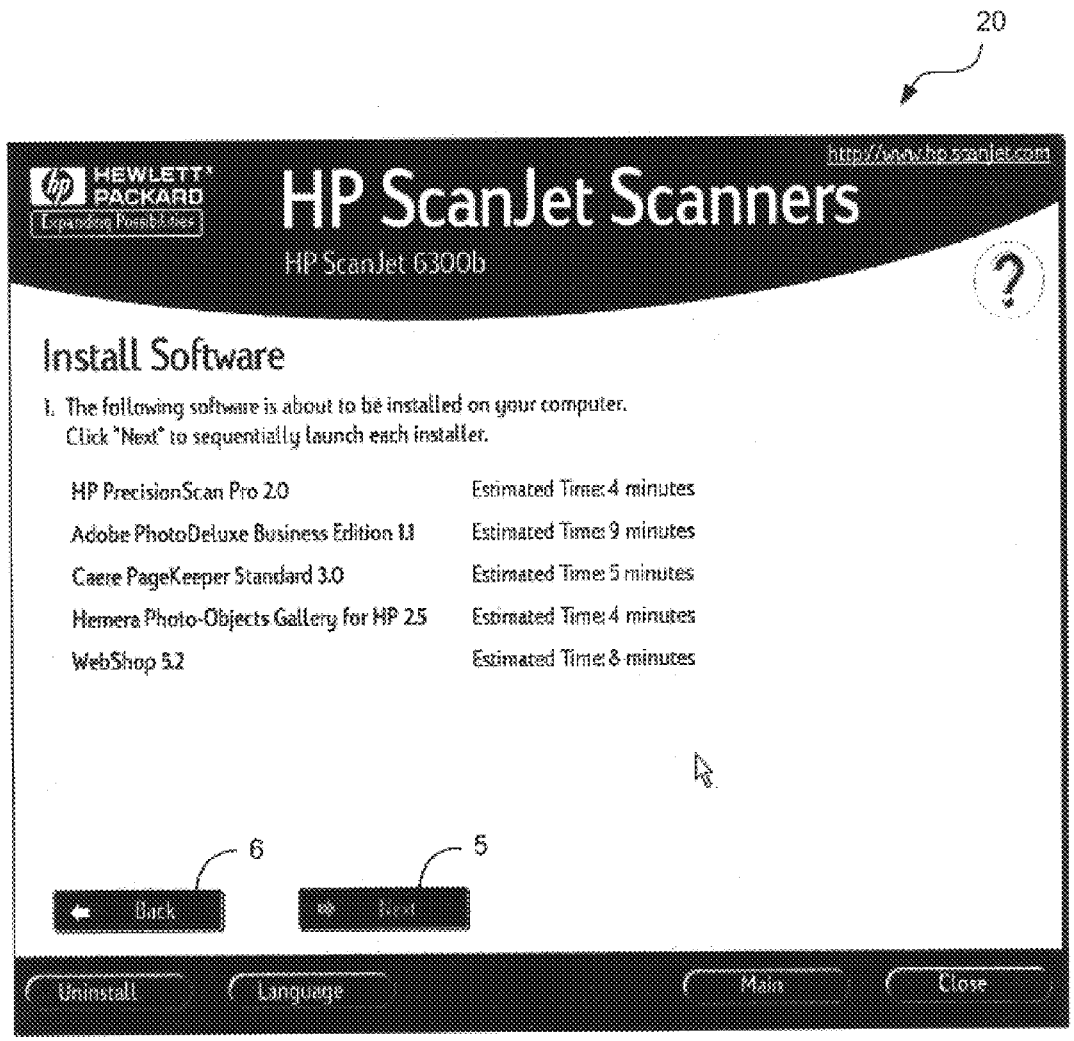
FIG. 4 is a drawing of a screen that is displayed to the user by the scanner installation program of the present invention when the "Next" button in the screen shown in FIG. 3 is clicked.

Once the user has selected the software packages to be installed, the user is instructed to click the "Next" button 4 by a message 5. Upon clicking the "Next" button 4, the screen 20 shown in FIG. 4 is displayed, which lists the selected software packages and the estimated installation time for each package. The user can confirm the selections by clicking the "Next" button 5 shown in FIG. 4 to sequentially launch each software package installer automatically. Alternatively, the user can click the "Back" button 6, which will cause screen 10 of FIG. 3 to be displayed to provide the user with the option of changing the software package selections. If the required software package is not in the list, a confirmation prompt (not shown) will be displayed.

Figure 5:
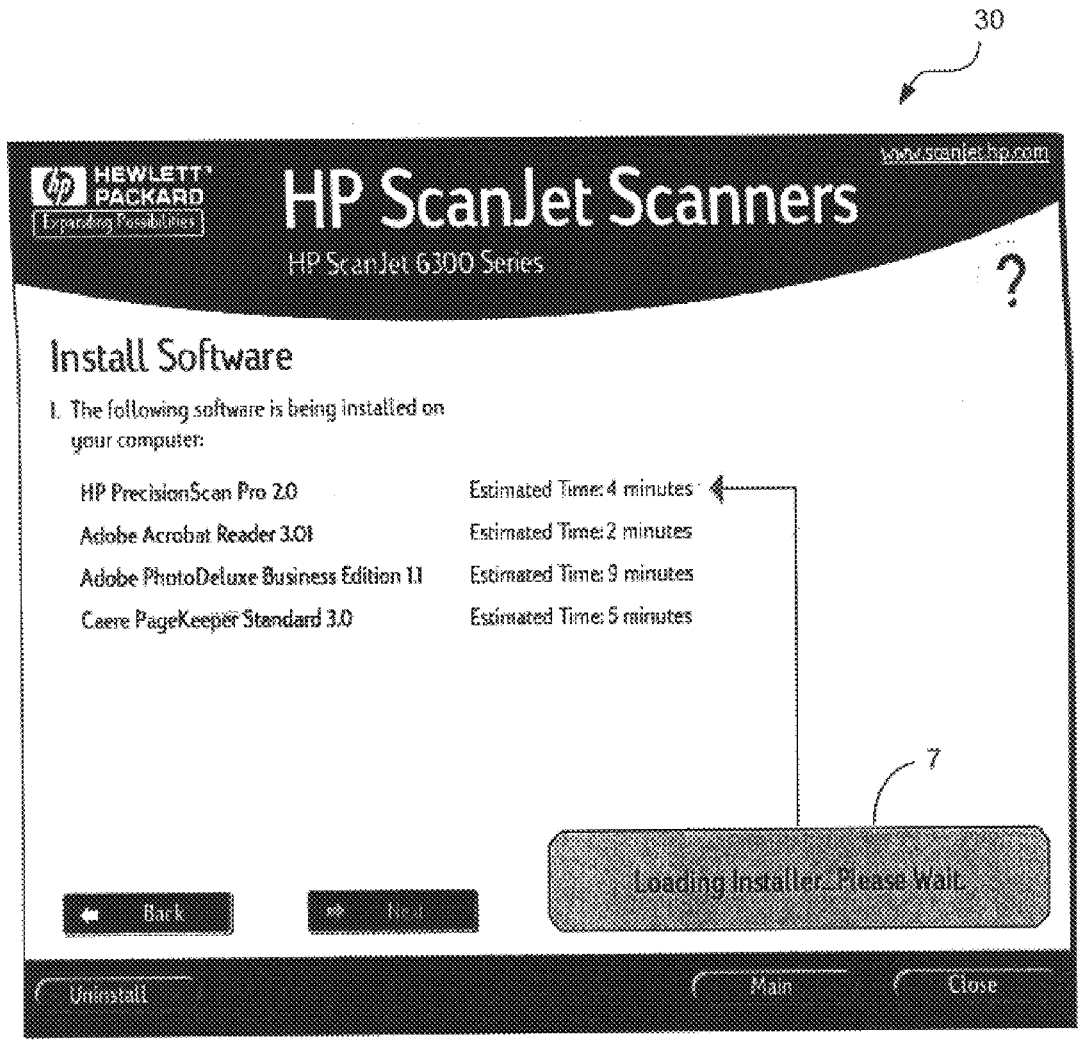
FIG. 5 is a drawing of a screen that is displayed to the user by the scanner installation program of the present invention when the "Next" button in the screen shown in FIG. 4 is clicked.

When the "Next" button 5 is clicked in the screen shown in FIG. 4, the screen 30 shown in FIG. 5 is displayed. As each installer program is loaded, a message 7 is displayed that states "Loading installer . . . Please wait" with an arrow pointing to the software package title associated with the installer being loaded. As each installer finishes loading and closes, the background status window 10 shown in FIG. 3 displays a checkmark 8 beside the package that was just installed. If a problem with the installation occurs, a gold warning triangle (not shown) with an exclamation point in the middle of it is displayed beside the software package title to provide the user with further status feedback. If the user cancels out of one of the software installers by clicking on one of the boxes 9 in FIG. 3, a confirmation prompt (not shown) is displayed allowing the user to cancel out of the remaining installers.

Once all selected software packages have been installed, a dynamic link library (DLL) cleanup routine runs and the screen 10 shown in FIG. 3 displays the list of titles and associated status (i.e., checkmark if installed, warning triangle if error). The user is then guided on what to do next depending on the status of the installation. If the scanner is detected as being already attached to the computer interface, the user is prompted to restart the computer to eliminate any DLL conflicts that may have been caused by the software installation. Some operating systems perform DLL version enforcement. In this case, the DLL cleanup routine will not need to be executed. If the scanner is not yet attached to the computer interface, the user is prompted to click the "Next" button to return to the main screen 1 of FIG. 1. At the main menu 1, the user is prompted by a message 11 to continue by clicking the button 12 labeled "Step 2. Instructions for Connecting Scanner."

When the required software has been installed and the main menu screen 1 shown in FIG. 1 is displayed, Step 1 of FIG. 1 is checked off, as shown, and a message 13 is displayed that states: "Your scanning software appears to be installed correctly!". Therefore, the user is provided with progress feedback. Once the scanner has been physically connected and has been detected as connected, Step 2 is checked off and a message (not shown) is displayed that states "Your scanner appears to be connected correctly" thereby providing progress feedback to the user. The user may click the button labeled "Step 3 Registration and Additional Help" for additional help. Upon clicking this button, the user is provided with information that will help the user get started scanning, as described below in more detail with reference to FIG. 8.

In order to display the correct information about the available software packages, the installation status of the software packages, and the available language options, settings for these items are stored in initialization files read by the scanner installation program and placed as property settings in a database internal to the program itself. The stored settings are values such as file pathnames, registry pathnames and values, language names, text descriptions, and installer task names.

The scanner installation program automatically detects the current operating system language of the user's PC and displays that language by default. If the user changes the language in which the program is to be displayed, translated text strings in that language are loaded from language-specific initialization and media object files.

The Scanner installation program of the present invention automatically detects the input/output ports (I/Os) that are available on the user's PC. The program also contains initialization file values for the I/Os that the scanner supports. Furthermore, the scanner installation program automatically detects the operating system (OS) that is on the PC. Based on all of this information, the scanner installation program informs the user of the interface that has been detected and that is available for connection to the scanner. The manner in which the scanner installation program detects the I/Os that are available on the user's computer will be discussed below in detail.

Figure 6:
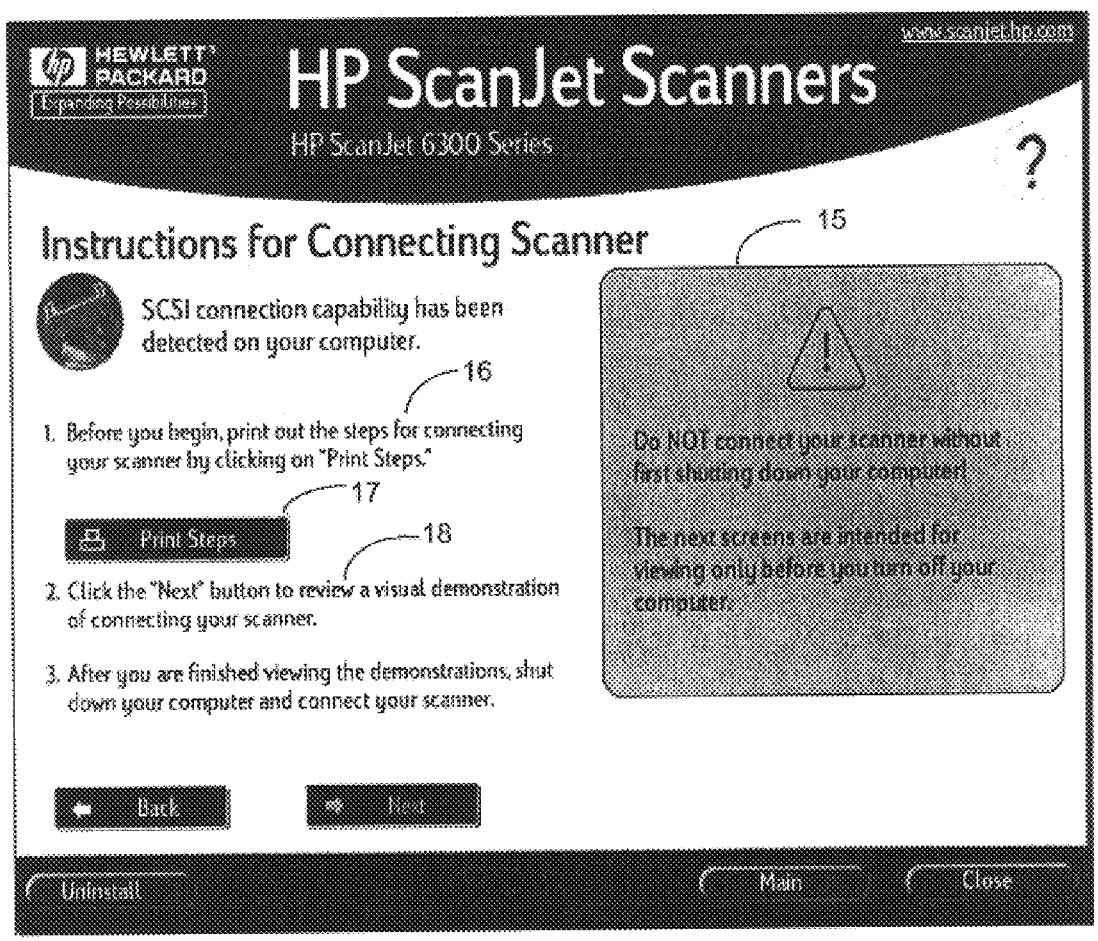
FIG. 6 is a drawing of a screen that is displayed to the user by the scanner installation program of the present invention when the button in the screen shown in FIG. 1 labeled "Step 2. Instructions for Connecting Scanner" is clicked.

If a USB interface is detected, the user is informed that the user can hot-plug the scanner and is given the option of printing out the steps to attach the scanner to the user's computer. If a SCSI or Parallel interface is detected, a blinking warning triangle with an exclamation point in the middle of it is displayed over a message telling the user not to connect the scanner without first shutting down the computer. This latter case is shown in FIG. 6. When the user clicks on the button 12 (FIG. 1) labeled "Step 2. "Instructions for Connecting Scanner", the screen 40 shown in FIG. 6 is displayed. A message 15 with an exclamation mark informs the user that the following sequence of screens is for viewing only, before they turn off their computer. A message 16 instructs the user to print out the connection steps and save them so that they can be referred to when their computer is off. Upon clicking on the "Print Steps" button 17 shown in FIG. 6, the sequence of steps for connecting the scanner to the computer is printed out. The steps for connecting the scanner to the parallel, USB and SCSI interfaces of a computer are shown in FIGS. 9, 10 and 11, respectively.

Figure 7:
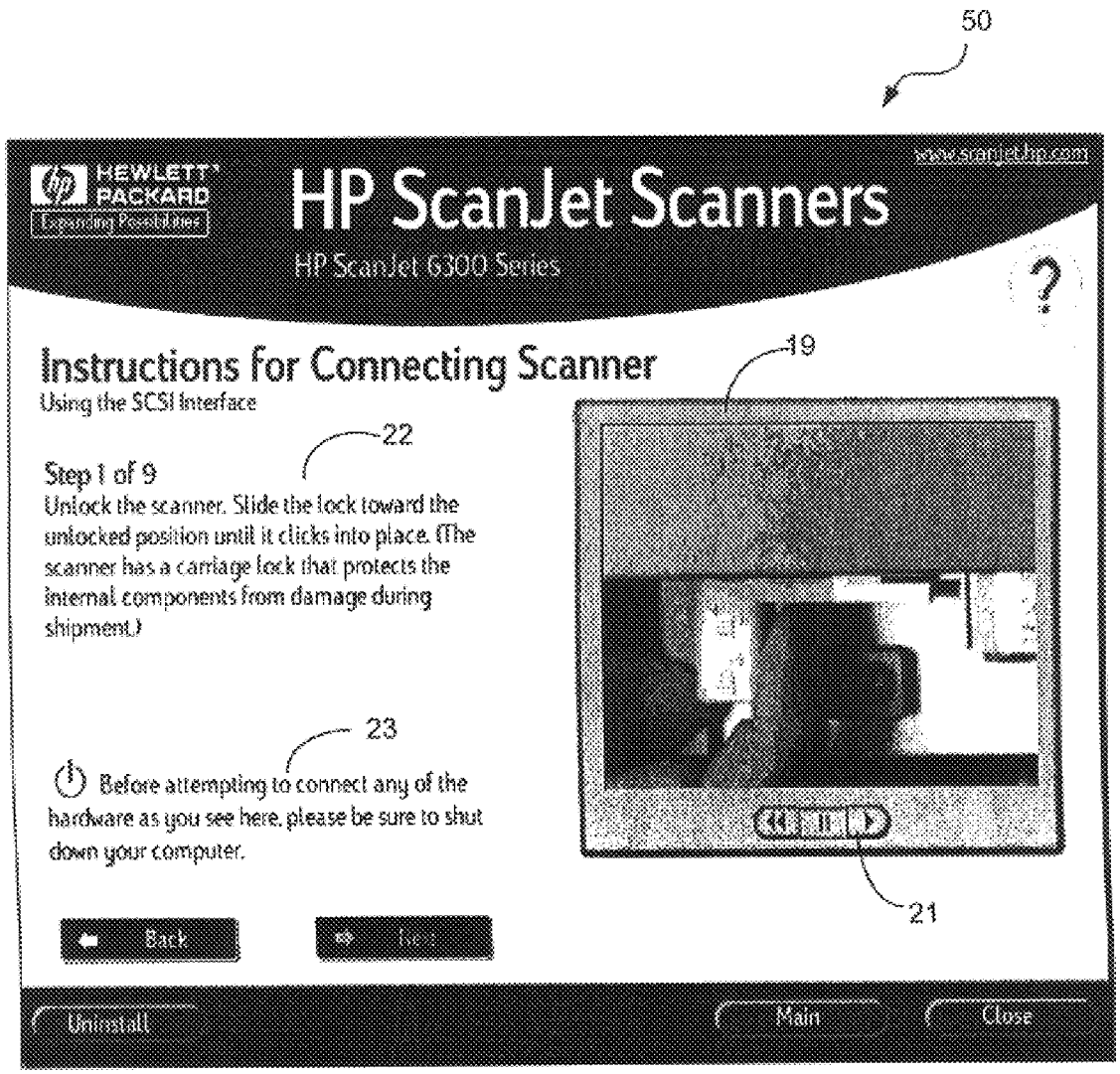
FIG. 7 is a drawing of a screen that is displayed to the user by the scanner installation program of the present invention when the "Next" button in the screen shown in FIG. 6 is clicked.

A message 18 instructs the user to click the "Next" button to review a visual demonstration of demonstrating how to connect the scanner. Upon clicking the "Next" button shown in FIG. 6, the user is taken through a sequence of screens showing the text for each step and a still image or video of how to perform the step. FIG. 7 illustrates one of the screens 50 that is displayed to the user to demonstrate one of the steps that need to be taken when connecting the scanner to an SCSI interface of the user's computer. As can be seen in the screen 50, a video clip 19 will be played when the user clicks on the play icon 21 below the video image. A message 22 is displayed in screen 50 that describes the installation step. Another message 23 is displayed in screen 50 that tells the user to shut down the computer before attempting to connect any of the hardware shown.

Figure 8:
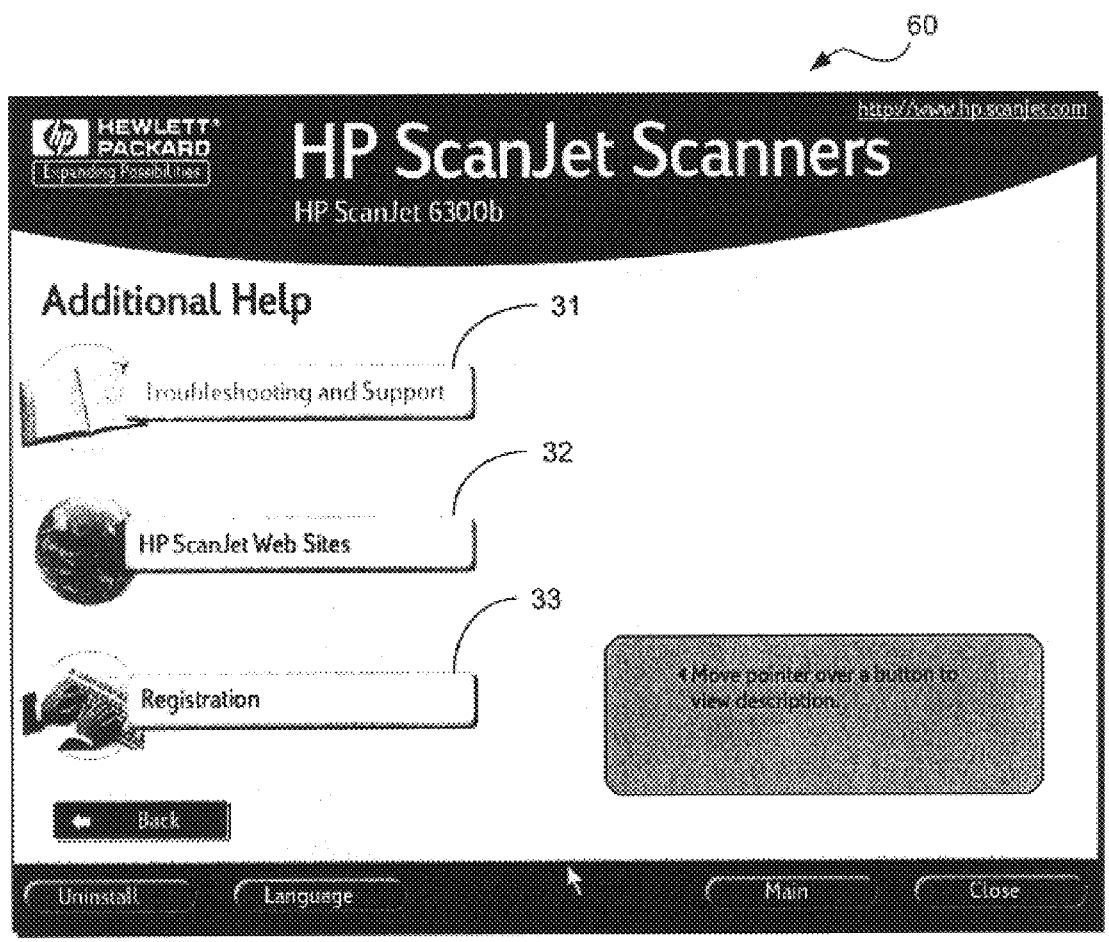
FIG. 8 is a drawing of a screen that is displayed to the user by the scanner installation program of the present invention when the button in the screen shown in FIG. 1 labeled "Step 3. (Optional) Additional Help" is clicked.

When the computer is restarted, the scanner installation program resumes automatically and displays the main menu screen 1 shown in FIG. 1. The message 26 in the main menu screen 1 is displayed. If the user clicks on the button 27 labeled "Step 3 Registration and Additional Help", the help screen 60 shown in FIG. 8 is displayed to help the user get started using the scanner. The help screen 60 provides the user with buttons 31, 32 and 33 that enable the user to have one-click access to troubleshooting and support documentation, HP ScanJet scanner Web sites, Web-based scanner registration, a product demo-tutorial (optional), and scanner test diagnostics (optional).

For a USB interface, after the scanner has been connected and the steps described in the various screens have been taken by the user, the user is prompted (not shown) to click the "Next" button to return to the Main screen 1. As stated above, the scanner installation program of the present invention automatically detects which interfaces are available on the user's computer. The routine that performs this task will be referred to herein as the "IdentifyHardware( )" routine. The IdentifyHardware( ) routine is performed when the button 12 labeled "Step 2 Instructions for Connecting Scanner" on the main menu 1 shown in FIG. 1 is clicked.

In order to detect the presence of a USB or SCSI port on the computer, a IdentifyHardware( ) routine of the scanner installation program attempts to open up the device driver handle for each of these types of I/O ports. If the attempt to open up the device driver handle is successful, a registry entry is written to the system registry of the computer that indicates that the computer is USB- or SCSI-ready. The IdentifyHardware( ) routine checks the system registry to determine whether the corresponding registry entry has been written to the system registry. In order to detect whether the scanner has been connected, the routine opens up the device driver handle, enumerates all of the devices on the USB and/or SCSI bus, and compares the ID of the devices found to the ID of the scanner for which the routine is searching. This ID is stored in the initialization file. If a match is found, the routine sets a registry flag in the system registry that indicates the scanner is connected. The routine checks the system registry and determine whether this flag has been set. If so, the routine determines that the scanner is connected.

In order to detect a parallel scanner, i.e., a scanner that is connected to the parallel port of the computer, the IdentifyHardware() routine of the scanner installation program loads the parallel scanner driver toolkit and attempts to initialize the scanner. If the scanner initialization succeeds, the routine writes a registry entry to the system registry to indicate that the scanner is connected to the computer. It is assumed that the computer comprises a parallel port because most computers do have parallel ports for attachment to printers.

Figure 12:
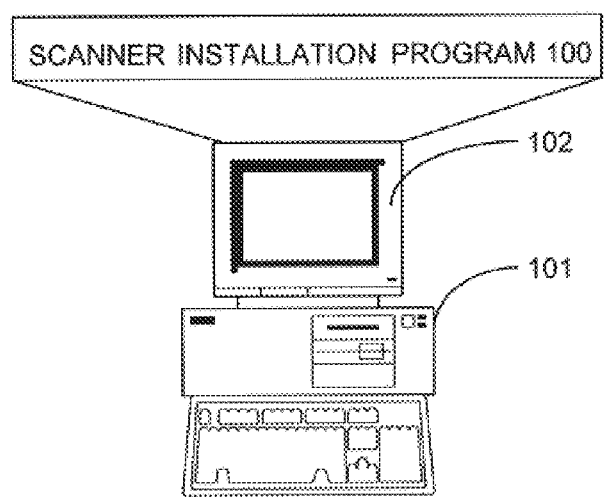
FIG. 12 illustrates the apparatus of the present invention.

FIG. 12 illustrates the apparatus of the present invention. The apparatus of the present invention comprises a computer (e.g., a PC) 101 that is capable of executing the scanner installation program 100 of the present invention. The term "computer", as that term is used herein, is intended to denote any type of machine that is capable of accepting a structured input and of processing that input in accordance with a set of prescribed rules. Therefore, the apparatus of the present invention is not limited with respect to the type or configuration of the computer that executes the scanner installation program 100. The apparatus of the present invention also comprises a display monitor 102 for displaying the aforementioned screens generated by the scanner installation program.

The scanner installation program of the present invention preferably is initially stored on a memory device (not shown) that is external to the computer 101, such as, for example, the aforementioned CDROM device. Therefore, the computer 101 preferably is equipped with an input device that is capable of reading a CD ROM. The scanner installation program 100 is then launched from the CD ROM. However, the scanner installation program 100 could also be stored on other types of computer-readable mediums including, for example, magnetic storage devices and solid state memory devices. The scanner installation program may also be stored in a memory device within the computer 100, such as, for example, a random access memory (RAM) device.

It should be noted that the present invention has been described with reference to the preferred embodiments, but that the present invention is not limited to these embodiments. Those skilled in the art will understand that various modifications can be made to the embodiments discussed above without deviating from the scope of the present invention. For example, many of the screens can be modified to provide additional and/or different information to the user. Also, additional screens may be displayed to the user. Therefore, those skilled in the art will understand that the present invention is not limited to the screens discussed above.

What is claimed is:

1. A system for installing a scanner to a computer, said system comprising:

first logic, the first logic being configured to automatically detect whether or not a particular input/output (I/O) port of the computer is available for connection to the scanner;

second logic, the second logic being configured to cause a message to be displayed on a display device of the computer, the message indicating whether or not a particular I/O port of the computer is available for connection to the scanner; and third logic, the third logic being configured to generate a visual demonstration and to cause the visual demonstration to be displayed on the display device, the visual demonstration demonstrating steps that should be taken by a user in connecting the scanner to a particular I/O port of the computer.

2. The system of claim 1, wherein the visual demonstration is a video clip.

3. The system of claim 1, wherein the visual demonstration is a series of still photographs.

4. The system of claim 1, further comprising:

fourth logic, the fourth logic being configured to generate textual instructions and to cause the textual instructions to be printed on a printer in communication with the apparatus, the textual instructions instructing a user as to the manner in which the scanner can be connected to a particular I/O port of the computer.

5. The system of claim 4, further comprising fifth logic, the fifth logic being configured to detect whether or not the scanner is connected to an I/O port of the computer, wherein the fifth logic detects whether or not the scanner is connected to an I/O port of the computer by opening up a device driver associated with the I/O port, enumerating all devices interfaced with an I/O bus of the computer, and comparing an identification (ID) indication associated with the scanner with ID indications associated with the devices that are interfaced with the I/O bus.

6. The system of claim 5, wherein if a determination is made by the fifth logic that the scanner is connected to an I/O port of the computer, the fifth logic sets a registry flag in the system registry associated with the computer, wherein setting the registry flag indicates that the scanner is connected to an I/O port of the computer.

7. The system of claim 1, further comprising:

a first scanner operative to acquire image data.

8. The system of claim 7, further comprising:

a first computer to which the first scanner is to be installed.

9. The system of claim 1, wherein the first logic, second logic and third logic are stored on a computer-readable medium.

10. A system for installing a scanner to a computer, said system comprising:

first logic, the first logic being configured to automatically detect whether or not a particular input/output (I/O) port of the computer is available for connection to the scanner;

second logic, the second logic being configured to cause a message to be displayed on a display device of the computer, the message indicating whether or not a particular I/O port of the computer is available for connection to the scanner;

third logic, the third logic being configured to cause a software installation screen to be displayed on the display device, the software installation screen displaying options as to which scanning software packages may be installed on the computer; and fourth logic, the fourth logic being configured to detect when a particular scanning software package has been selected by a user and to cause a message to be displayed on the display device that indicates the amount of memory that is required for installation of the selected scanning software package.

11. The system of claim 10, wherein the message displayed by the fourth logic indicates the amount of time that is required for the selected scanning software package to be installed on the computer.

12. A system for installing a scanner to a computer, said system comprising:

first logic, the first logic being configured to automatically detect whether or not a particular input/output (I/O) port of the computer is available for connection to the scanner; and second logic, the second logic being configured to cause a message to be displayed on a display device of the computer, the message indicating whether or not a particular I/O port of the computer is available for connection to the scanner;

wherein the first logic determines whether or not a particular I/O port of the computer is available for connection to the scanner by attempting to open up a device driver handle associated with the particular I/O port, wherein if the first logic is successful in attempting to open up the device driver handle, a registry entry is written to a system registry of the computer that indicates that the particular I/O port is available for connection to the scanner.

13. A system for installing a scanner to a computer, said system comprising:

first logic, the first logic being configured to automatically detect whether or not a particular input/output (I/O) port of the computer is available for connection to the scanner;

second logic, the second logic being configured to cause a message to be displayed on a display device of the computer, the message indicating whether or not a particular I/O port of the computer is available for connection to the scanner; and third logic, the third logic changing a language that a message is displayed in based on a language-specific initialization file values, the third logic displaying screen titles, button labels and procedure steps based on a language-specific media object file.

14. A method for installing a scanner, the method comprising:

automatically detecting whether or not a particular input/output (I/O) port of a computer is available for connection to the scanner;

causing a message to be displayed on a display device of the computer that indicates whether or not a particular I/O port is available for connection to the scanner; and generating a visual demonstration and causing the visual demonstration to be displayed on the display device, the visual demonstration demonstrating steps that should be taken by a user in connecting the scanner to a particular I/O port of the computer.

15. The method of claim 14, wherein the visual demonstration is a video clip.

16. The method of claim 14, wherein the visual demonstration is a series of still photographs.

17. The method of claim 14, further comprising:

generating textual instructions; and causing the textual instructions to be printed on a printer, the textual instructions instructing a user as to the manner in which the scanner can be connected to a particular I/O port of the computer.

18. The method of claim 14, further comprising:

causing a software installation screen to be displayed on the display device, the software installation screen displaying options as to which scanning software packages may be installed on the computer;

detecting when a particular scanning software package has been selected by a user; and causing a message to be displayed on the display device that indicates the amount of memory that is required for installation of the selected scanning software package and the amount of time that is required for the selected scanning software package to be installed on the computer.

19. A method for installing a scanner, the method comprising:

automatically detecting whether or not a particular input/output (I/O) port of a computer is available for connection to the scanner; and causing a message to be displayed on a display device of the computer that indicates whether or not a particular I/O port is available for connection to the scanner, wherein the step of automatically detecting whether or not a particular I/O port of the computer is available for connection to the scanner is performed by attempting to open up a device driver handle associated with the particular I/O port, wherein if the attempt at opening up the device driver handle is successful, a registry entry is written to a system registry of the computer that indicates that the particular I/O port is available for connection to the scanner.

20. A method for installing a scanner, the method comprising:

automatically detecting whether or not a particular input/output (I/O) port of a computer is available for connection to the scanner; and causing a message to be displayed on a display device that indicates whether or not a particular I/O port is available for connection to the scanner; and automatically detecting whether or not the scanner is connected to an I/O port of the computer by opening up a device driver associated with the I/O port, enumerating all devices interfaced with an I/O bus of the computer, and comparing an identification (ID) indication associated with the scanner with ID indications associated with the devices that are interfaced with the I/O bus, wherein if a determination is made that the scanner is connected to an I/O port of the computer, a registry flag is set in the system registry associated with the computer, wherein setting the registry flag indicates that the scanner is connected to an I/O port of the computer.

21. A system for installing a scanner to a computer, said system comprising:

logic operative to:

automatically detect whether or not a particular input/output (I/O) port of the computer is available for connection to the scanner;

cause a message to be displayed on a display device of the computer, the message indicating whether or not a particular I/O port of the computer is available for connection to the scanner; and generate a visual demonstration and to cause the visual demonstration to be displayed on the display device, the visual demonstration demonstrating steps that should be taken by a user in connecting the scanner to a particular I/O port of the computer.

22. The system of claim 21, wherein the logic is further operative to:

generate textual instructions and to cause the textual instructions to be printed on a printer in communication with the apparatus, the textual instructions instructing a user as to the manner in which the scanner can be connected to a particular I/O port of the computer.

23. The system of claim 21, wherein the logic is further operative to:

detect whether or not the scanner is connected to an I/O port of the computer by opening up a device driver associated with the I/O port, enumerate all devices interfaced with an I/O bus of the computer; and compare an identification (ID) indication associated with the scanner with ID indications associated with the devices that are interfaced with the I/O bus.

24. A system for installing a scanner to a computer, said system comprising:
- means for automatically detecting whether or not a particular input/output (I/O) port of a computer is available for connection to the scanner;
- means for causing a message to be displayed on a display device of the computer that indicates whether or not a particular I/O port is available for connection to the scanner; and
- means for generating a visual demonstration and causing the visual demonstration to be displayed on the display device, the visual demonstration demonstrating steps that should be taken by a user in connecting the scanner to a particular I/O port of the computer.

25. The system of claim 24, further comprising:

means for generating textual instructions; and means for causing the textual instructions to be printed on a printer, the textual instructions instructing a user as to the manner in which the scanner can be connected to a particular I/O port of the computer.

* * * * *